United States Patent [19]

Kerr

[11] 4,283,680
[45] Aug. 11, 1981

[54] ELECTRICAL BRIDGE BALANCING CIRCUIT

[75] Inventor: Bruce G. Kerr, Amersham, England

[73] Assignee: Goring Kerr Limited, Windsor, England

[21] Appl. No.: 15,013

[22] Filed: Feb. 26, 1979

[51] Int. Cl.³ .................... G01N 27/72; G01R 33/12
[52] U.S. Cl. .................................. 324/234; 324/225; 324/233
[58] Field of Search ............... 324/225, 228, 233, 239, 324/243, 234

[56] References Cited

U.S. PATENT DOCUMENTS

| 2,489,920 | 11/1949 | Michel | 324/243 |
| 2,768,347 | 10/1956 | Hansen | 324/243 |
| 4,006,407 | 2/1977 | Flaherty et al. | 324/233 |

FOREIGN PATENT DOCUMENTS

| 533902 | 2/1941 | United Kingdom . |
| 677773 | 8/1952 | United Kingdom . |
| 682544 | 11/1952 | United Kingdom . |
| 776163 | 6/1957 | United Kingdom . |
| 988325 | 4/1965 | United Kingdom . |
| 1115229 | 5/1968 | United Kingdom . |

*Primary Examiner*—Gerard R. Strecker
*Assistant Examiner*—Walter E. Snow
*Attorney, Agent, or Firm*—Pollock, Vande Sande & Priddy

[57] ABSTRACT

An electric sensing circuit, typically a metal detector includes a bridge including inductors. The out of balance condition of the bridge is stored on a capacitor and a balancing signal is fed to balance the bridge in dependence upon the stored value of the charge. The stored value of the charge is only updated in response to relatively slow changes in the out of balance condition of the bridge. Relatively rapid changes in the out of balance condition are used to provide an output signal for alarm or measuring purposes, and the arrangement is thereby so arranged that the balancing signal does not attempt to automatically balance out the output signal giving the alarm or measurement.

12 Claims, 5 Drawing Figures

ELECTRICAL BRIDGE BALANCING CIRCUIT

FIELD OF THE INVENTION

This invention relates to an electrical sensing circuit which includes a bridge and means for setting the bridge in balance. This invention has particular, but not sole, application to a metal detector.

BACKGROUND TO THE INVENTION

In many electrical circuits which include bridge circuits, for example many measuring instruments, it is necessary to maintain the bridge circuit in balance. This can be effected by periodically re-balancing the bridge, either manually or automatically. One of the problems with automatic balancing is that during the period that the bridge circuit is responding to effect a measurement the automatic balancing will start to correct for the error signal which is produced as representing the measurement.

SUMMARY OF THE INVENTION

It is an object of the present invention to provide an electrical circuit which includes a bridge and a sensing means for providing an output indicative of the in or out of balance condition of the bridge, which automatically causes the sensing means to indicate bridge balance in the absence of some perturbing condition affecting the bridge, but which allows the sensing means to produce an output indicative of the out of balance condition of the bridge when such a perturbing condition occurs.

In accordance with the present invention, the output of the sensing means is stored for example on a capacitor and the stored value of this output is used to develop a signal which is fed back to the circuit such that the sensing means indicates bridge balance in the absence of a perturbation of the bridge, and the stored value of the output is only altered to take account of changes of value of the output in the event that the output changes its value at a rate less than a predetermined rate. If the output changes at a rate greater than this predetermined rate the occurrence of a perturbation applied to the bridge is indicated, and accordingly, the sensing means can provide an output indicative of the out of balance condition caused by the perturbation without the feed back signal increasing to cancel out the out of balance condition.

The present invention has particular but not exclusive application to metal detectors wherein inductors are connected in a bridge, the inductors being formed in a probe, which is swept over a surface to detect the presence of metal. The metal will cause a change in the inductances presented by the inductors. The circuit of the invention when applied to a metal detector allows long term drifts in the bridge to be balanced out automatically whilst still rendering the circuit responsive to rapid changes of the bridge to an out of balance condition, produced by the passage of the probe over a metallic object.

In a preferred embodiment of a metal detector according to the invention, both the inductive and resistive components of the bridge impedances are balanced automatically, and means are provided to discriminate between the detection of ferrous and non-ferrous metal.

Further features, objects and advantages of the present invention will appear from the following description of preferred embodiments thereof given by way of illustrative example with reference to the accompanying drawings.

DESCRIPTION OF PREFERRED EMBODIMENTS

Figure 1:
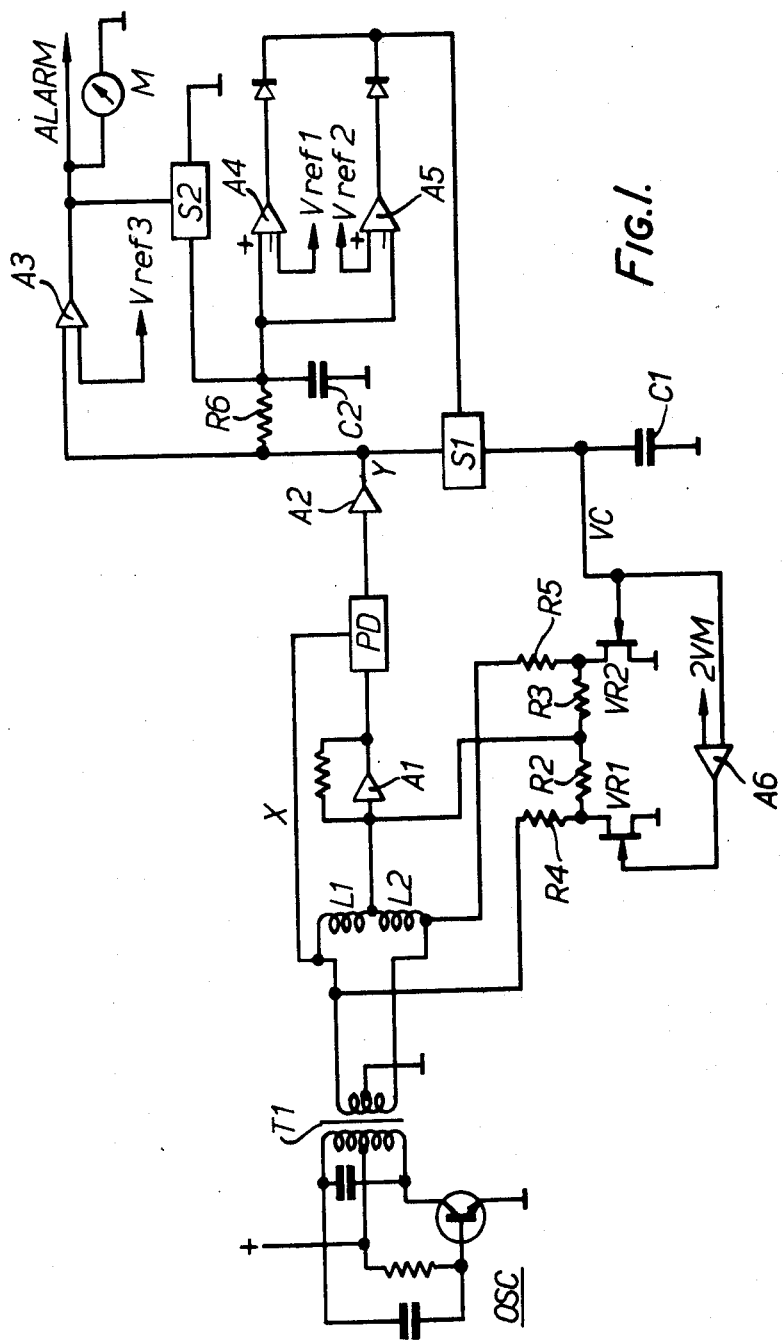
FIG. 1 is an electrical circuit diagram of a first embodiment of metal detection system.

Referring firstly to FIG. 1, there is shown a circuit diagram of a metal detection system which detects a piece of metal by responding to a change in inductance of one or other of two coils L1, L2 mounted in a probe (not shown), upon inductive coupling of that coil with the piece of metal.

The circuit comprises an oscillator OSC with centre tapped transformer T1. The two secondary winding sections and the coils L1, L2 are connected as a bridge the output of which is connected to an amplifier A1. A phase detector PD is connected to the output of amplifier A1 and is supplied with a reference voltage over a line X from the junction between coil L1 and its respective transformer secondary section. An amplifier A2 is connected to the output of the phase detector PD and has its own output connected to a junction point Y.

Balancing for the bridge circuit is provided by a DC controlled bridge circuit comprising F.E.T.s VR1 and VR2 (acting as variable resistors) and resistors R2 and R3. The junctions of the two F.E.T.s with the respective resistors R2 and R3 are connected across the secondary of transformer T1 through resistors R4, R5 so that a proportion of the oscillator output is applied to VR1 and VR2. A control voltage which is stored on a capacitor C1 (as will be explained) is applied directly to the gate of F.E.T. VR2 and to the inverting input of an amplifier A6, to the non-inverting input of which is applied an offset voltage 2 VM. Amplifier A6 is an inverting DC amplifier with a gain of unity, so that when the value of the control voltage VC equals VM, the output of amplifier A6 is also VM. This amplifier output is connected to the gate of F.E.T. VR1, as shown. The junction of resistors R2 and R3 is connected to the input of amplifier A1.

Junction point Y is connected through a normally open electronic switch S1 to the storage capacitor C1. Point Y is also connected to an input of an amplifier trigger circuit A3 which is controlled by a reference voltage Vref3. The output of amplifier trigger circuit A3 drives an indicating meter IM, an alarm and a normally open electronic switch S2.

Junction point Y is also connected through a delay circuit R6, C2 to an input of both of two amplifier trigger circuits A4, A5. These two amplifier trigger circuits are controlled by reference voltages Vref1 and Vref2, respectively, which are negative and positive, respectively, but of equal magnitude less than that of Vref3. The outputs of amplifier trigger circuits A4, A5 are connected together to drive the normally open electronic switch S1. When switch S1 is closed, it connects the junction point Y to the storage capacitor C1.

In operation, the oscillator OSC operates at, say, 2 kilocycles and if the coils L1 and L2 are equal in resistance and inductance, the amplifier A1 will provide zero output signal, assuming zero input to amplifier A1 from the F.E.T. balancing bridge. In the latter connection, it will be noted, that if a voltage VC=VM is stored on capacitor C1, and therefore applied to the gate of F.E.T. VR2, an equal voltage VM will be provided by amplifier A6 and applied to the gate of F.E.T. VR1. Under this condition, the two F.E.T.s have equal resistance and, because they are supplied with equal antiphase voltages from transformer T1, the net input to amplifier A1 via resistors R2 and R3 is zero.

If an AC error signal should be provided by amplifier A1, representing some inbalance between coils L1 and L2, this error signal is converted to a DC voltage by the phase detector PD, which DC voltage is positive or negative according to the phase of the AC error relative to the phase of the reference signal provided over line X. This DC voltage is amplified by amplifier A2 and is applied to capacitor C1, when electronic switch S1 is closed (as will be described). Accordingly, the voltage VC stored on capacitor C1 depends upon the AC error signal produced by amplifier A1.

If the voltage VC stored on capacitor C1 differs from VM, then the gate voltages of the two F.E.T.s will be different and an output signal will appear at the junction of resistors R2 and R3. This signal will correspond in phase to one or other section of the transformer secondary, depending whether the stored voltage VC is greater than or less than VM. The arrangement is such that the signal thus applied to the input of amplifier A1 from the balancing bridge is of appropriate phase to substantially cancel the original error.

The balancing bridge will continue to correct increasing errors until the DC control voltage on F.E.T. VR1 or VR2 causes cut off and then no greater AC correction signal is available.

The opening and closing of electronic switch S1 is controlled by the amplifier trigger circuits A4, A5 and their input delay circuit R6, C2. Should a DC error signal build up slowly at junction Y, either positively or negatively, the the respective one of amplifier trigger circuits A4, A5 will provide an output when the magnitude of the DC error signal exceeds Vref1 and Vref2. Switch S1 is thereby closed to re-establish the balance of the bridge circuit. Once the DC error signal at Y returns to zero, the output of whichever of amplifiers A4, A5 that has been operated disappears and the switch S1 is opened, however leaving capacitor C1 with the voltage required to maintain balance.

A rapid change in error signal at junction Y indicates that a peice of metal is being detected by one or other of coils L1, L2, because thermal drift or the like, will produce only relatively slow changes. If a rapid change occurs of magnitude Vref3 or more, then trigger amplifier A3 will produce an output to energize the alarm and drive the indicating meter. The magnitude of Vref3 is greater than that of Vref1 and Vref2, and the delay circuit R6, C2 prevents amplifier A4 or A5 operating before amplifier A3. The output of amplifier A3, when it is operated by the rapid change in error signal, closes switch S2 to prevent capacitor C2 charging and therefore preventing amplifier A4 or A5 from operating.

Accordingly, re-balancing can only take place in the normal condition, wherein no piece of metal is being detected and therefore switch S2 is kept open. Slow changes of error signal, caused by thermal drift or the like, initiate the re-balancing before the error signal reaches a magnitude sufficient to operate amplifier A3. Once the error signal exceeds Vref3, amplifier A3 provides an output linearly related to the deviation of the bridge circuit from its balanced condition.

Figure 2:
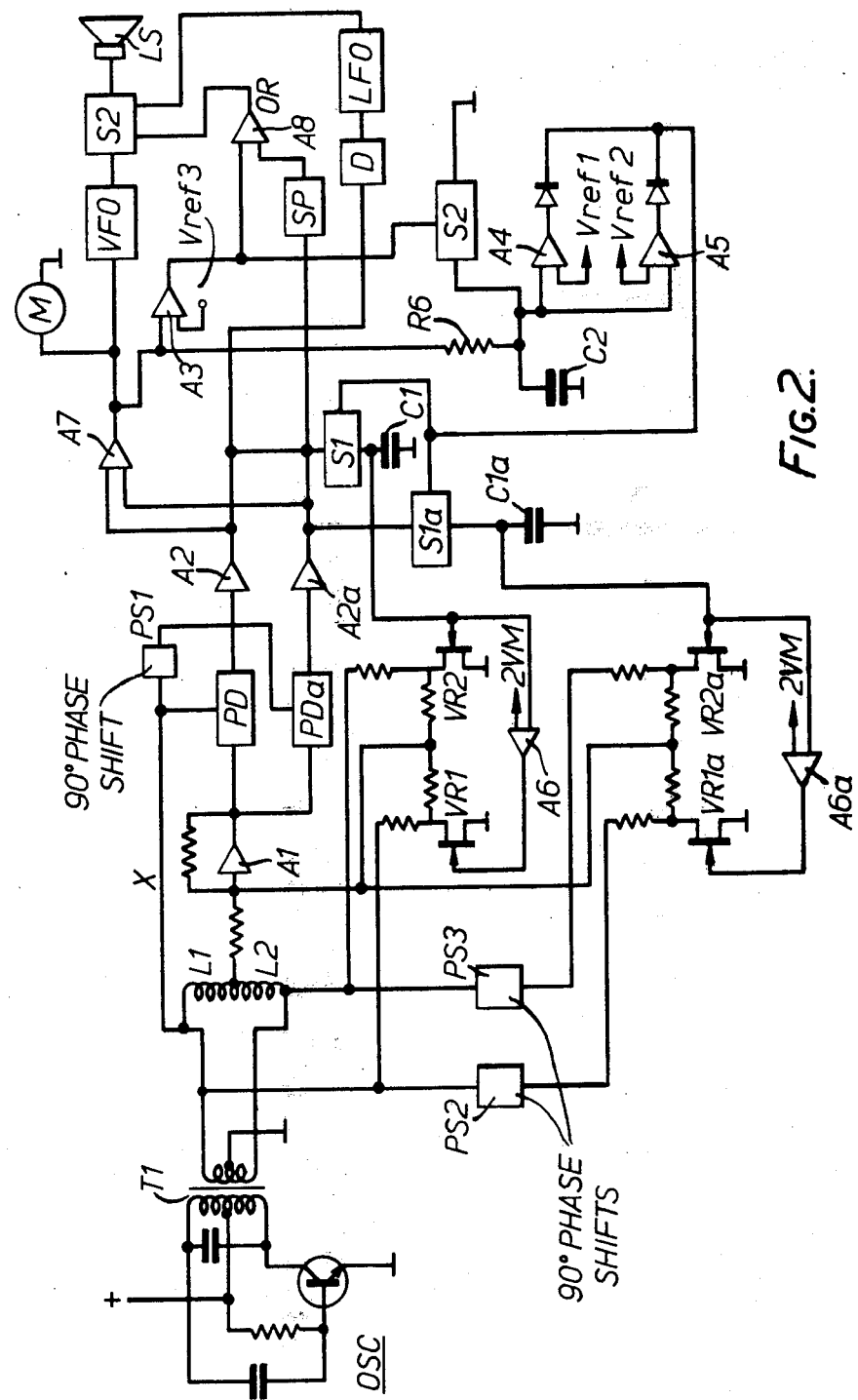
FIG. 2 is an electrical circuit diagram of a second embodiment of metal detection system, having additional balancing facility, an audible alarm system and an arrangement for discriminating between ferrous and non-ferrous metals.

The system of FIG. 1 is designed to balance out only the inductive components of the impedances of the bridge. The system can however be readily modified to balance out both the resistive and the inductive components of the bridge impedances and such a modified system is shown in FIG. 2. The system of FIG. 2 also includes an audible alarm system connected to the output of the bridge, the alarm system providing by means of a loudspeaker LS, a continuous tone which increases in frequency as the coils L1, L2 are moved close to an object of ferrous metal, and a similar tone which is cyclically interrupted if the metal is non-ferrous. The system also includes a discriminator to indicate that the probe (that includes the coils L1, L2) is correctly oriented (as will be explained hereinafter).

Referring now to FIG. 2 in detail, in order to additionally balance out the resistive components of the bridge, the amplifier A1 feeds its output to another phase sensitive detector PDa supplied with a reference signal from line X through a 90° phase shift circuit PS1. Thus the detector PDa receives a reference signal appropriately phased to enable phase detection of the resistive component of the bridge. An amplifier A2a amplifies the output of the phase sensitive detector PDa, and the outputs of the amplifiers A2, A2a are combined by a mixing amplifier A7. The output of the mixing amplifier A7 is fed to the threshold amplifier A3 for comparison with the reference signal Vref3 such that the amplifier A3 provides an alarm output when the out of balance condition of the bridge exceeds a level set by Vref3. The output of the mixing amplifier A7 is also fed to the amplifier trigger circuits A4, A5 through the time constant circuit C2, R6. The switch S2 is operated when an output is produced by the amplifier A3, in order to short out the effect of the capacitor C2. Thus, one of the amplifiers A4, A5 will provide an output only when the combined output from mixing amplifier A7 changes at less than a predetermined rate defined by the time constant circuit C2, R6 to a level exceeding either Vref1 or 2. Separate storage capacitors are provided to store a balancing signal for the resistive and inductive components of the bridge; capacitor C1 is connected to the amplifier A2 through switch S1 as in FIG. 1, and an additional capacitor C1a is connected to the amplifier A2a through a switch S1a. Both the switches are operated in response to an output from the amplifiers A4, A5.

The D.C. voltage stored on the capacitor C1a controls a second balancing bridge which comprises FET VR1a and VR2a with an associated amplifier A6a, all corresponding to the first balancing bridge and associated amplifier A6. This second balancing bridge is supplied with AC from the transformer T1's secondary through 90° phase shift circuits PS 2, 3 such that the second balancing bridge has an output of an appropriate phase for balancing the resistive component of the coils L1, L2. The outputs of the two balancing bridges are combined together as an input to the amplifier A1.

Thus, in use, the two balancing bridges supply to the amplifier A1, balancing signals which are effective to cause the amplifier A1 to provide an output indicative that the bridge which includes coils L1, L2 is balanced in respect of both its inductive and resistive components, the value of the balancing signals being determined by the value of the charges stored on the capacitors C1, C1a, the stored values being updated when the combined outputs of the amplifier A7 drifts slowly to exceed one of the thresholds set by the amplifiers A4, A5. The switches S1, S1a are then both closed to modify the values of charge or the capacitors C1, C1a. Thus, balance of the circuit is automatically effected in response to thermal drift or other long term changes in the operating condition of the circuit. In response to more rapid changes in the output of amplifier A7, such as will occur when the coils L1, L2, are moved over a metal object, the output will exceed Vref3, amplifier A3 will provide an output and the switch S2 will operate to prevent the amplifiers A4, A5 operating the switches S1, 1a, hence preventing re-balancing of the bridge. The output of the amplifier A3 causes the loudspeaker LS to be switched on as will now be described in detail.

The output of the amplifier A3 is fed through an operational amplifier A8, which operates as an OR gate, to operate an electrical switch S2 which gates a continuous audio signal produced by a variable frequency oscillator VFO to the loudspeaker LS. The oscillator VFO operates at a frequency determined by the output voltage level of the mixing amplifier A7 and as a result, as the probe which includes the coils L1, L2 is moved closer to a metallic object the frequency of sound produced by the loudspeaker and the oscillator VFO, increases.

Figure 3:
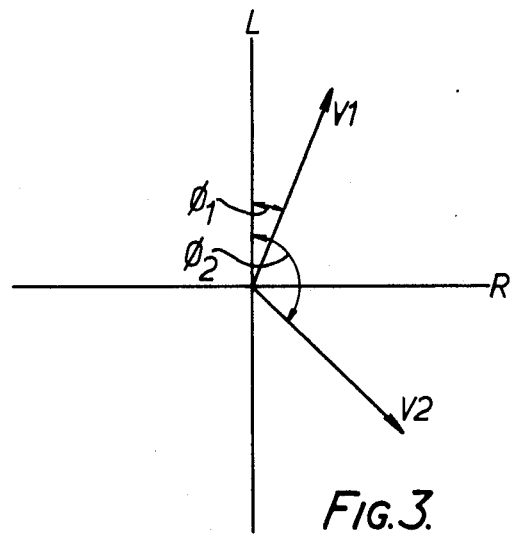
FIG. 3 is a vector diagram for explaining operation of the means for discriminating between ferrous and non-ferrous metals.

The system is arranged to discriminate between ferrous and non-ferrous objects. To this end, the circuit includes a detector D which detects the polarity of the output signal of the amplifier A2, which operates a low frequency oscillator LFO. The low frequency oscillator LFO operates at much lower frequency than the variable frequency oscillator VFO, and is used to operate the switch S2 cyclically. The principle of operation of the detector D can be seen from FIG. 3, which is a vector diagram of the phase of outputs of the amplifier A1 (relative to the reference phase X) produced in response to the coils L1, L2, being passed over ferrous and non-ferrous metal objects respectively. When the coils L1, L2, are passed over a ferrous object, the amplifier A1 provides an output V1 with a phase angle $\phi_1$. Experiments have shown that generally, for ferrous objects $-\pi/2 < \phi_1 < \pi/2$. Similarly, for a non-ferrous object, the amplifier A1 provides an output V2 having a phase angle $\phi_2$ where generally, $\pi/2 < \phi_2 < 3\pi/2$. Thus, ferrous objects generally provide a positive phase component in the inductive component of the amplifier A1, and non-ferrous objects generally provide a negative phase component in the inductive component of the amplifier A1. This relationship manifests itself in the apparatus of FIG. 2, in terms of the polarity of the output of the phase detector PD (which detects the phase of the inductive component from A1). Accordingly, if the polarity of the output of the detector PD is negative, the metal being detected is in general of a non-ferrous variety. If the output of PD is negative, the polarity detector D provides an output which switches on the oscillator LFO causing the switch S2 to operate cyclically such that the loudspeaker LS produces an interrupted tone. Thus, the loudspeaker produces a continuous tone for ferrous objects and a cyclically interrupted tone for non-ferrous objects.

Figure 4:
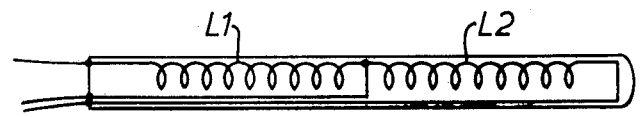
FIGS. 4 and 5 illustrate different probes for use with the system of FIG. 2.

A practical form of a probe including the coils L1, L2, is shown in FIG. 4. The probe consists of a rod having the coils L1, L2 wound along its length, the connections between the coils and the rest of the apparatus being effected by an electrical cable, not shown. For certain applications, in particular medical applications, it is desirable to form the probe as a flat spatula, in which case the coils are wound in the configuration shown in FIG. 5, such that the spatula has flat opposed surfaces 10, 11.

Figure 5:
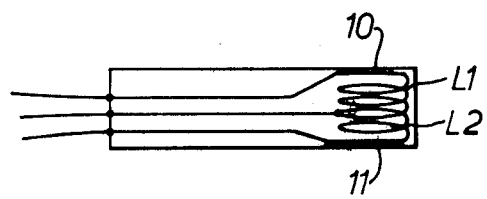

A problem with the spatula type probe of FIG. 5 is that a phase shift in output of the amplifier A1 is produced depending on which side 10, 11 of the probe is closest to a metallic object being detected. This phase shift will cause the polarity detector D to provide incorrect results for the discrimination between ferrous and non ferrous objects. Accordingly, the apparatus will work properly only when for example the side 10 of the spatula is closest to the metallic object, and will give incorrect results when the side 11 is closest to the object. In certain situations, it is not possible to determine visually which side of the spatula is closest to the metallic object, for example when the spatula is inserted into an incision. It is however a feature of the apparatus of FIG. 2 that it provides a characteristic low frequency tone from the loudspeaker in the event that the wrong side of the spatula is closest to the object being detected.

The phase shift produced by the wrong side of the spatula being closest to the object consists of 1 180° shift in the phase of the resistive component of the output of amplifier A1 and accordingly the phase shift produces an inversion in the polarity of the output of the phase detector PDa which detects the phase of the resistive component). Such a polarity inversion is detected by a circuit SP which provides an output through the OR gate A8 to operate the switch S2 such that the oscillator VFO is connected to the loudspeaker. The combination of the inverted polarity signal from the phase detector PDa and the signal from the detector PD, will result in an unusually low magnitude signal being produced by the mixing amplifier A7, which will accordingly result in the oscillator VFO operating at a low frequency. In proper operation of the apparatus, the amplifier A3 does not provide an output in response to such low magnitude signals from the amplifier A7, and hence the low frequency output produced in response to operation of the circuit SP, is not heard in proper operation of the system. Accordingly, this low tone is a characteristic indication that the probe of FIG. 5 needs to be turned over such that the circuit D can operate properly.

I claim:

1. An electrical sensing circuit comprising:
   bridge circuit means including an electrical bridge and sensing means for producing an output signal which is a function of the in or out of balance condition of the bridge;
   storage means for storing the value of said output signal;
   balancing means responsive to said storage means for applying a balancing signal to said bridge circuit means for tending to cause said output signal to represent a balanced condition of the bridge, the value of said balancing signal being a function of the value of said output signal stored by said storage means;
   threshold means responsive to said output signal for producing a switch control signal which assumes a first state when the value of said output signal changes at less than a predetermined rate to exceed a predetermined threshold;

switching means responsive to said switch control signal for applying said output signal to said storage means when said control signal is in said first state to modify the stored value of said storage means; and alarm means for providing an alarm signal in response to said output signal changing at a rate greater than said predetermined rate to exceed a given level.

2. An electrical sensing circuit according to claim 1 wherein said bridge is formed of inductors, an oscillator is arranged to supply an oscillatory electric current to the bridge, and said sensing means includes a phase sensitive detector arranged to compare the phase of a signal taken from the bridge with a reference phase taken from said oscillator.

3. An electrical sensing circuit according to claim 2 wherein said balancing means includes means for deriving said balancing signal from the bridge circuit means at the frequency of said oscillatory signal and with an amplitude determined by the value of said output signal stored by the storage means, and means for feeding said balancing signal to the phase sensitive detector.

4. An electrical sensing circuit according to claim 3 wherein the reference phase and the phase of said further signal is appropriate for rendering the output from the phase sensitive detector indicative of the in or out of balance condition of the inductive components of the impedances of the bridge.

5. An electrical sensing circuit according to claim 1 for detecting the presence of metal including means responsive to the phase of the signal supplied from the bridge to the sensing means for indicating whether the inductances of the bridge are being placed out of balance by the presence adjacent thereto of ferrous or non-ferrous metal.

6. An electrical sensing circuit comprising:

bridge circuit means including an electrical bridge and first and second sensing means for producing first and second output signals which are a function of the in or out of balance condition of inductive and resistive components of the bridge respectively;

first and second storage means for storing the values of said first and second output signals respectively;

first and second balancing means responsive to said first and second storage means respectively for applying to the bridge first and second balancing signals respectively for tending to cause said first and second output signals to indicate a balanced condition of the inductive and resistive components of the bridge, the values of said first and second balancing signals respectively being a function of the values of said first and second output signals stored by said storage means;

combining means for combining together said first and second output signals to provide a combined output signal;

threshold means responsive to said combined output signal for providing a switch control signal which assumes a first state when the value of said combined output signal changes at less than a predetermined rate to exceed a predetermined threshold;

first and second switching means responsive to said switch control signal for respectively applying the first and second output signals to the first and second storage means when said control signal is in said first state to modify the stored values thereof; and alarm means for providing an alarm signal in response to said combined output signal changing at a rate greater than said predetermined rate to exceed a given level.

7. An electrical sensing circuit according to claim 6 wherein each said sensing means comprises a phase sensitive detector, and including means for supplying a reference signal derived from said oscillator to said phase sensitive detectors, and a phase shifter arranged to introduce a 90° phase shift between the reference signals applied to the phase sensitive detectors.

8. An electrical sensing circuit according to claim 6 including a polarity detector responsive to the output of said sensing means which indicates the in or out of balance condition of the inductive components of the bridge.

9. An electrical sensing circuit according to claim 8 including a variable frequency oscillator arranged to produce an audible frequency oscillatory electrical signal the frequency of which is determined by the magnitude of said combination of said first and second output signals, a loudspeaker connected to the oscillator through a third switching means, and means for operating said third switching means to apply the output of the oscillator to the loudspeaker in response to said combination of said first and second output signals exceeding a predetermined reference voltage.

10. An electrical sensing circuit according to claim 9 including an oscillator responsive to the output of said polarity detector and arranged to operate said third switching means cyclically.

11. An electrical sensing circuit according to claim 9 or 10, including a further polarity detector responsive to the polarity of the output of the sensing means that indicates the in or out of balance condition of the resistive components of the bridge differing from a predetermined polarity for indicating an incorrect physical arrangement of the inductances in the bridge.

12. An electrical sensing circuit according to claim 11 wherein said further polarity detector is arranged to operate said third switching means.

* * * * *